United States Patent
Ishimoto et al.

(10) Patent No.: US 6,263,082 B1
(45) Date of Patent: *Jul. 17, 2001

(54) PSEUDORANDOM NUMBER GENERATION CIRCUIT AND DATA COMMUNICATION SYSTEM EMPLOYING THE SAME

(75) Inventors: Junichi Ishimoto; Masanori Tanaka, both of Kanagawa (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,186

(22) Filed: Nov. 20, 1997

(30) Foreign Application Priority Data

Jan. 16, 1997 (JP) .................................... 9-005335

(51) Int. Cl.[7] ........................................................ H04L 9/26
(52) U.S. Cl. ............................. 380/46; 380/265; 708/250; 708/252
(58) Field of Search ..................................... 708/250, 251, 708/252, 253, 254, 255, 256, 3; 380/46, 265

(56) References Cited

U.S. PATENT DOCUMENTS

| | | | |
|---|---|---|---|
| 3,790,768 | 2/1974 | Chevalier et al. | 235/331 |
| 4,553,251 | 11/1985 | Hartmann | 375/114 |

FOREIGN PATENT DOCUMENTS

| | | | |
|---|---|---|---|
| 0095272 | 5/1983 | (EP) | G06F/7/58 |
| 0095272 | * 11/1983 | (EP) | G06F/7/58 |
| 0580870 | 12/1993 | (EP) | G06F/7/58 |
| 0 580 870 | 2/1994 | (EP) . | |
| 0 619 659 | 10/1994 | (EP) . | |
| 5-327427 | 12/1993 | (JP) . | |

OTHER PUBLICATIONS

Patent Abstracts Of Japan; vol. 96; No.1, Jan. 31, 1996 & JPX 07 148904 A (Toshiba); Abstract.
Patent Abstracts Of Japan, vol. 96, No. 1, Jan. 1996.

* cited by examiner

Primary Examiner—Gilberto Barron, Jr.
Assistant Examiner—Ho S. Song
(74) Attorney, Agent, or Firm—Sughrue, Mion, Zinn, Macpeak & Seas, PLLC (57) ABSTRACT

A pseudorandom number generation circuit 2 whose generation timings of pseudorandom numbers vary randomly is disclosed. The pseudorandom number generation circuit 2 includes a clock generation circuit 4 which generates four kinds of clocks, a selection signal generation circuit 8 which generates selection signals randomly, a selection circuit 6 which selects either one of the four kinds of clocks based on the selection signals, and a linear feedback shift register (LFSR) 10 which carries out shift operation based on the clock selected by the selection circuit 6. The LFSR 10 generates a pseudorandom number in response to the selected clocks. Since the selection of the clock is carried out randomly by the selection signal generation circuit 8, the generation timings of the pseudorandom numbers generated by the LFSR 10 are also random.

6 Claims, 6 Drawing Sheets

PSEUDORANDOM NUMBER GENERATION CIRCUIT AND DATA COMMUNICATION SYSTEM EMPLOYING THE SAME

BACKGROUND OF THE INVENTION

1. Field of the Invention

The present invention relates to a pseudorandom number generation circuit using a linear feedback shift register (referred to as LFSR hereinafter) and a data communication system employing the circuit, and more particularly to a pseudorandom number generation circuit which gives an irregularity to the cycle of the random numbers and a data communication system employing the circuit.

2. Description of the Related Art

Heretofore, cryptographic algorithms using random numbers have been utilized in data communication systems in view of security. As random numbers used in cryptographic algorithms, pseudorandom numbers that can be generated easily by means of software are used more frequently than intrinsic random numbers owing to the ease in handling and the simplicity in processing.

As for pseudorandom number generation circuit for generating pseudorandom numbers, circuits using an LFSR are well known. An LFSR comprises a plurality of registers connected in series and an exclusive OR circuit. The output signals of two specified registers among the plurality of registers are supplied to the input node of the exclusive OR circuit, and the output signal of the exclusive OR circuit is fed back to the leading register. Moreover, a shift clock is supplied in common to all of these registers. With this constitution, it is possible to obtain pseudorandom number sequences with relatively long cycle.

For example, the cycle of pseudorandom number sequences generated by an LFSR consisting of n registers is equal to that of maximum length linearly recurring sequences (called M-sequences) of n-th degree, which is $2^n-1$. It should be noted that what is defined as a cycle here is not what is representing a time, but ration it is what is representing the number of ways (or length) in which the generated pseudorandom numbers can be regarded as being different kinds. In other words, an identical set of pseudorandom numbers will be generated repeatedly for every cycle.

Figure 8:
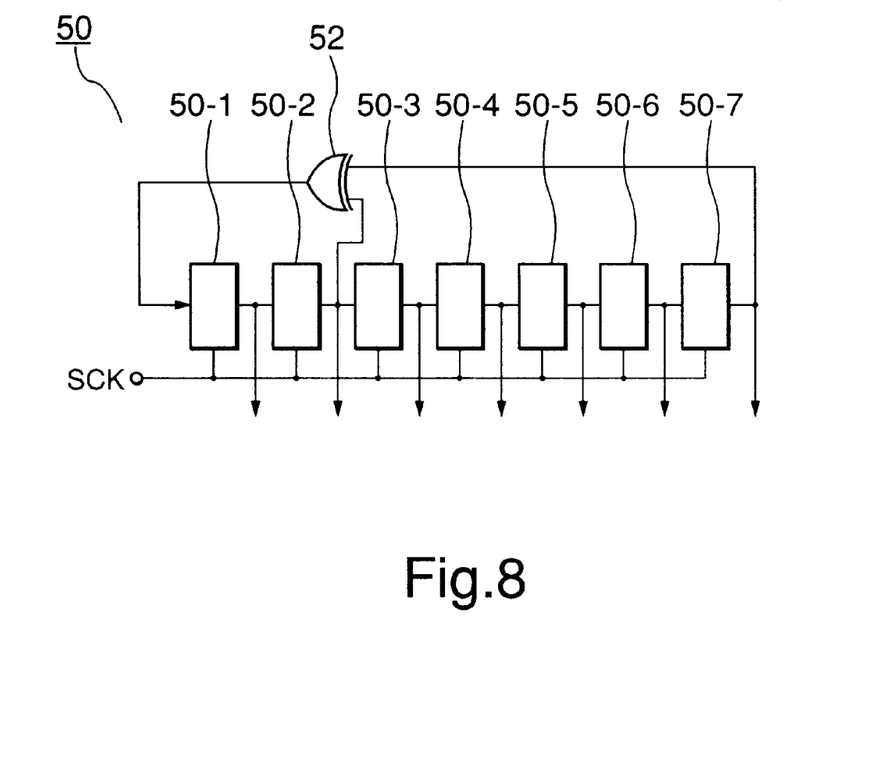
FIG. 8 is a block diagram showing a conventional pseudorandom number generation circuit 50.

In FIG. 8 is shown a block diagram of a conventional pseudoradom number generation circuit 50 employing an LFSR having 7 stages of registers. The pseudorandom number generation circuit 50 has a configuration in which the output of a second stage register 50-2 and the output of a final stage register 50-7, out of 7 registers 50-1 to 50-7 connected in series, are connected to the input node of an exclusive OR circuit 52, and the output node of the exclusive OR circuit 52 is fed back to a leading register 50-1. A shift clock SCK is supplied in common to all registers 50-1 to 50-7, and the LFSR is driven in response to the SCK. The outputs B1 to B7 of respective registers are taken out as forming a pseudorandom number.

Since bit strings of an M-sequence are generated in the case of a pseudorandom number generation circuit employing an LFSR, an LFSR consisting of 7 stages of registers generates 127 (namely, $2^7-1$) ways of pseudorandom numbers.

However, when the random number sequences generated by the pseudorandom number generation circuit 50 are used as seeds, namely, as cipher keys, for a cipher circuit, there is a possibility that a cipher text is decoded relatively easily. For example, in a stream type cryptography, a stream cryptogram is generated by taking exclusive OR of binary sequences of a plain text and binary pseudorandom number sequences generated by a pseudorandom number generation circuit. However, when the pseudorandom number sequences or the pseudorandom number sequence generation logic are deciphered, it is easy to reproduce a plain text from a cipher text obtained. As a result, the circuit no longer functions as an enciphering circuit.

It is therefore an important function required of a pseudorandom number generation circuit to be able to efficiently generate unpredictable pseudorandom number sequences for which attempts to decode a cipher text enciphered by an enciphering circuit will hardly meet with success. The simplest method to generate pseudorandom number sequences which will not readily lend itself to an easy data analysis is to increase the degree n (number of registers) of the M-sequences. Since, however, it is merely for enlarging the cycle of the pseudorandom number sequences, it cannot be considered to be an essential solution to the problem. Accordingly, in order to generate pseudorandom number sequences which are difficult to be analyzed by using the present method, it is necessary to employ an extremely large number of registers which leads to an increase in the circuit scale.

A pseudorandom number generation circuit which generates pseudorandom number sequences using small number of registers is disclosed in Publication of Japanese Patent publication No. Hei 5-327427. However, the pseudorandom number sequences generated by this circuit have merely an apparently long cycle, and the measure against an easy decoding essentially remains intact unresolved.

SUMMARY OF THE INVENTION

It is therefore an object of the present invention to provide a pseudorandom number generation circuit which can generate pseudorandom number sequences which are essentially difficult to decode.

It is another object of this invention to provide a data communication system which employs pseudorandom number generation circuits generating pseudorandom number sequences which are essentially difficult to decode.

The pseudorandom number generation circuit according to this invention is equipped with a selection signal generation circuit which generates a selection signal, a clock generation circuit generates a plurality of clock signals having different frequencies each other, a selection circuit which selects one of the clock signals in response to the selection signal, a first shift register circuit including a plurality of first register circuits connected in series which carries out shift operation in response to the selected clock signal selected by said selection circuit, a first exclusive OR circuit receiving output signals of two of the plurality of first register circuits, means for supplying an output signal of the first exclusive OR circuit to a first stage of the first shift register circuit, and means for extract contents of at least a part of the first register circuits.

In addition, the data communication system according to this invention is equipped with a first and a second cipher keys generation circuits which generate a first and a second cipher keys, respectively, an enciphering circuit which enciphers original data to enciphered data based on the first cipher key, and a deciphering circuit which deciphers the enciphered data to deciphered data based on the second cipher key, the first cipher key generation circuit including a first pseudorandom number generation circuit generating a first pseudorandom number, a first clock generator generating a first clock signal based on the first pseudorandom number, a second pseudorandom number generation circuit generating a second pseudorandom number in response to the first clock signal, and means for supplying the second pseudorandom number to the enciphering circuit as the first cipher key, the second cipher key generation circuit including a third pseudorandom number generation circuit generating a third pseudorandom number, a second clock generator generating a second clock signal based on the third pseudorandom number, a fourth pseudorandom number generation circuit generating a fourth pseudorandom number in response to the second clock signal, and means for supplying the fourth pseudorandom number to the deciphering circuit as the second cipher key.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Referring to the drawings, the embodiments of this invention will be described.

Figure 1:
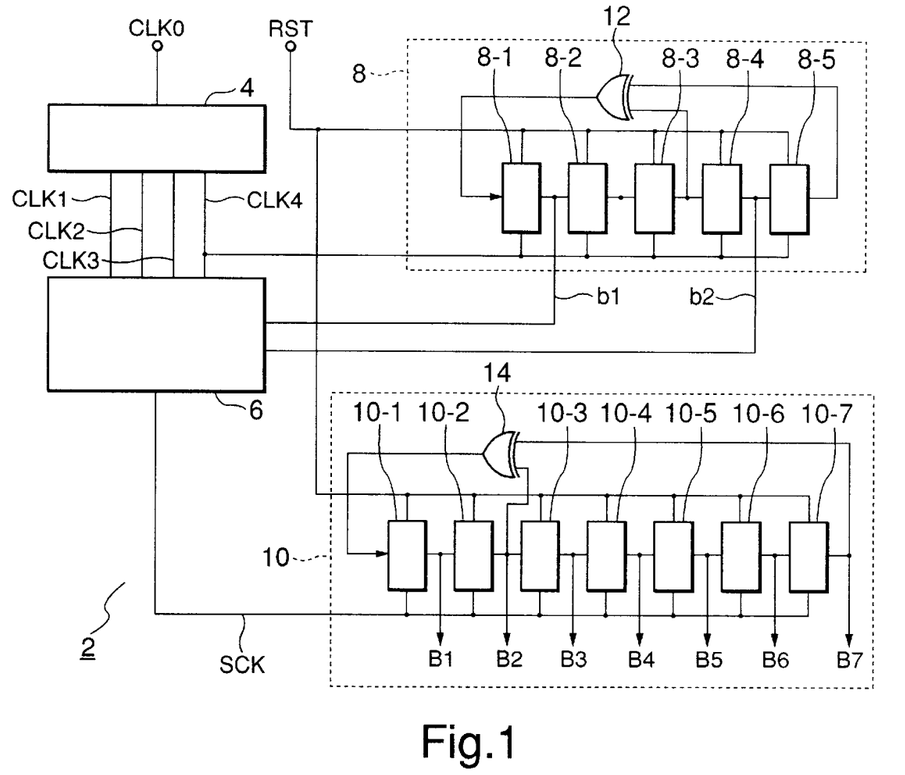
FIG. 1 is a block diagram of a pseudorandom number generation circuit 2 showing a first embodiment of this invention.

Referring now to FIG. 1, a pseudorandom number generation circuit 2 according to a first embodiment of the present invention comprises a clock generation circuit 4, a selection circuit 6, a selection signal generation circuit 8, and an LFSR 10.

The clock generation circuit 4 generates four clock signals CLK1 to CLK4 with mutually different frequencies by receiving a clock signal CLK0. The frequencies of these clock signals CLK1 to CLK4 are not particularly limited, but are set, for example, such that the frequency of CLK1 is twice the frequency of CLK2, the frequency of CLK2 is twice the frequency of CLK3, and the frequency of CLK3 is twice the frequency of CLK4.

The selection circuit 6 is a circuit which receives the clock signals CLK1 to CLK4 and selection signals b1 and b2, selects either one of the clock signals CLK1 to CLK4 based on the selection signals b1 and b2, and outputs it as a shift clock SCK. The selection circuit 6 selects the clock signal CLK1 when both of the selection signals b1 and b2 are "0" (at low level), selects the clock signal CLK2 when the selection signal b1 is "0" and the selection signal b2 is "1" (at high level), selects the clock CLK3 when the selection signal b1 is "1" and the selection signal b2 is "0", and selects the clock CLK4 when both selection signals b1 and b2 are "1".

The selection signal generation circuit 8 has an LFSR structure as shown in FIG. 1, and consists of five stages of registers 8-1 to 8-5 and an exclusive OR circuit 12. The output signal of the second stage register 8-3 and the output signal of the fifth stage (final stage) register 8-5 are supplied to the input nodes of the exclusive OR circuit 12, and the output signal of the exclusive OR circuit 12 is supplied to the first stage register 8-1. The clock signal CLK4 is supplied in common as a shift clock to the five stages of registers 8-1 to 8-5. The registers 8-1 to 8-5 carry out shift operation in response to the clock signal CLK4. In this embodiment, the selection signal generation circuit 8 is used a five stage LFSR structure, but this invention is not limited to five stages and it may have, for example, a seven stage structure. Moreover, CLK4 is adopted as the shift clock of the selection signal generation circuit 8 in this embodiment, but this invention is not limited to this case, and another clock may be used as the shift clock.

The LFSR 10 consists of seven stages of registers 10-1 to 10-7 and an exclusive OR circuit 14. The output signal of the second stage register 10-2 and the output signal of the seventh stage (final stage) register 10-7 are supplied to the input nodes of the exclusive OR circuit 14, and the output signal of the exclusive OR circuit 14 is supplied to the first stage register 10-1. A shift clock SCK is supplied in common to the seven stages of registers 10-1 to 10-7. The registers 10-1 to 10-7 carry out the shift operation in response to the shift clock SCK, and the outputs B1 to B7 of the registers are output to the outside as a pseudorandom number. The structure of the LFSR 10 is not limited to that of seven stages, and it may, for example, be of nine stages. In addition, in the LFSR 10, the input terminals of the exclusive OR circuit 14 are connected to the output node of the second stage register 10-2 and the seventh stage register 10-7, but the present invention is not limited to this case only and it may be connected to other registers as long as there are generated pseudorandom numbers of an M-sequence.

Moreover, a reset signal RST is supplied to the registers 8-1 to 8-5 and 10-1 to 10-7 commonly. The output of each of these registers is initialized to "1" (high level) when the reset signal RST goes to "1" (high level). The initial values are not limited to the case of all "1" and may be any other value as long as either of the register groups 8-1 to 8-5 or 10-1 to 10-7 is not all "0" (low levels).

Figure 3:
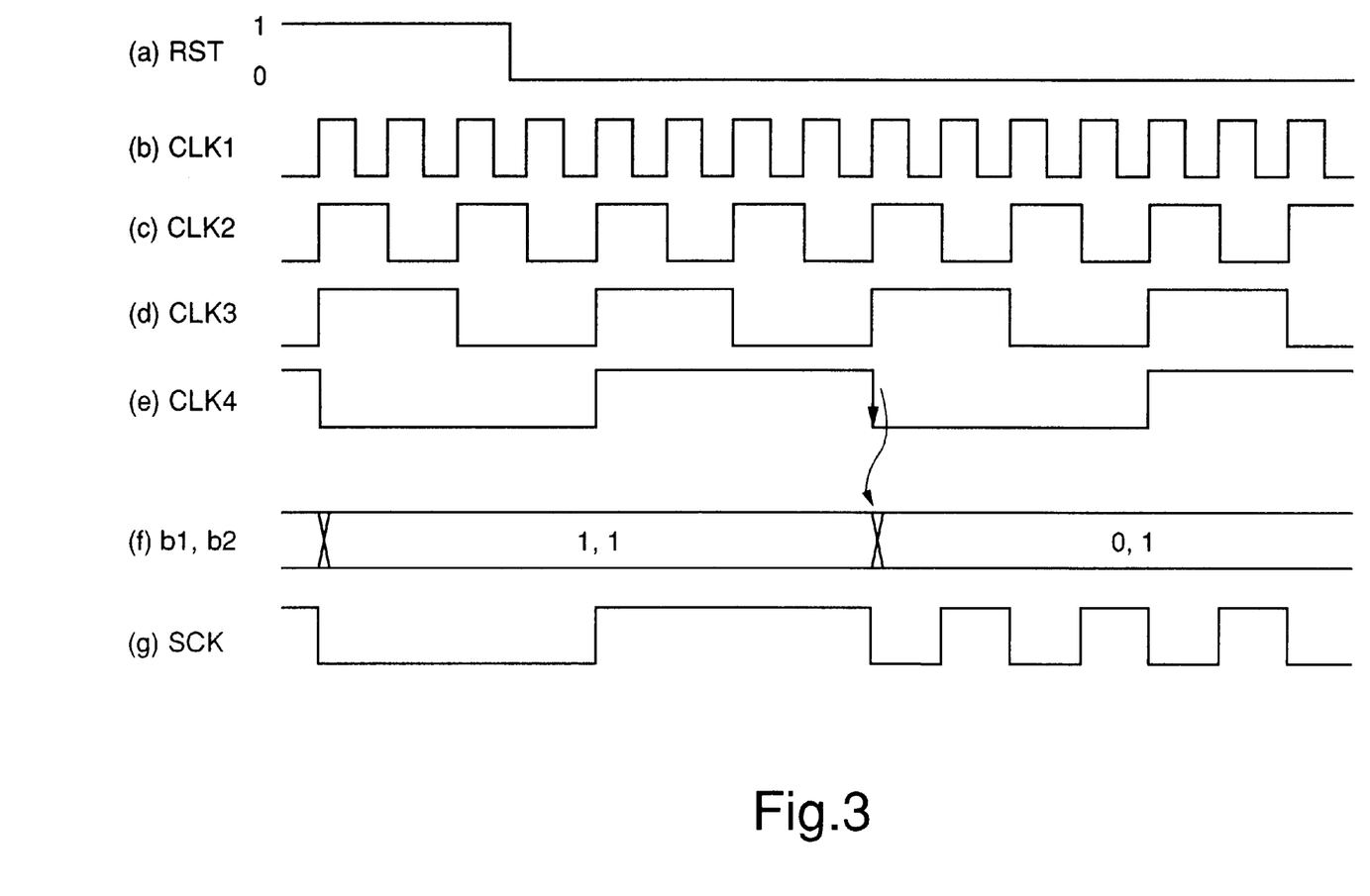
FIG. 3 is a timing chart showing the operation of the pseudorandom number generation circuit 2.

Next, referring to FIG. 3, the operation of the pseudorandom number generation circuit 2 will be described. First, during the period in which the reset signal RST is at high level, neither the selection signal generation circuit 8 nor the LFSR 10 carries out the shift operation, and their outputs b1 and b2, and B1 to B7 are fixed at their initial values (all "1"). Since both selection signals b1 and b2 have the value "1" in this case, the selection circuit 6 selects the clock signal CLK4, and outputs this as the shift clock SCK. However the registers 10-1 to 10-7 are initialized by the high level of the reset signal RST as mentioned above, the outputs B1 to B7 are held the state of being all "1" regardless of the shift clock SCK.

Subsequently, as the reset signal RST changes to "0" (low level), the initialization state is released to start the shift operation. Namely, the selection signal generation circuit 8 carries out the shift operation in response to the clock signal CLK4, and the LFSR carries out the shift operation in response to the shift clock SCK.

As the selection signals b1 and b2 output by the selection signal generation circuit 8 change as a result of the shift operations, the selection of the selection circuit 6 is also switched, and the frequency of the shift clock SCK is changed. In FIG. 3 is shown the situation in which the selection signals b1 and b2 change from (1, 1) to (0, 1), and based on this the frequency of the shift clock SCK is switched from the frequency of the clock signal CLK4 to the frequency of the clock signal CLK2. Similarly, as the selection signals b1 and b2 change to (1, 0) the frequency of the shift clock SCK goes to the frequency of the clock signal CLK3, and as the selection signals b1 and b2 are changed to (0, 0) the frequency of the shift clock SCK goes to the frequency of the clock signal CLK1.

As in the above, in the pseudorandom number generation circuit 2 of this embodiment, instead of using a clock with a single frequency as a shift clock for the LFSR 10, selection is made from a plurality of clock signals CLK1 to CLK4 with mutually different frequencies using the selection signals b1 and b2, and the shift operation is carried out based on the selected clock signal. Since the frequency of the shift clock changes moment to moment in this way, it becomes very difficult to decode data enciphered based on the generated pseudorandom numbers. Moreover, in the pseudorandom number generation circuit 2 according to this embodiment, a selection signal generation circuit 8 composed of a five stage LFSR is used for the generation of the selection signals b1 and b2, so the selection signals themselves are pseudorandom numbers, and hence the timing itself of selection switching of the selection circuit 6 changes randomly. In this way, the analysis of the generated pseudorandom numbers B1–B7 becomes the more difficult, and accordingly, decoding of data enciphered based on such pseudorandom numbers B1–B7 becomes extremely difficult.

Furthermore, in the pseudorandom number generation circuit according to this embodiment, the selected clock signals CLK1 to CLK4 are assumed to be signals that are mutually synchronous, but these signals may be assumed to be asynchronous. If they are made asynchronous, the decoding of the enciphered data becomes the more difficult.

Figure 2:
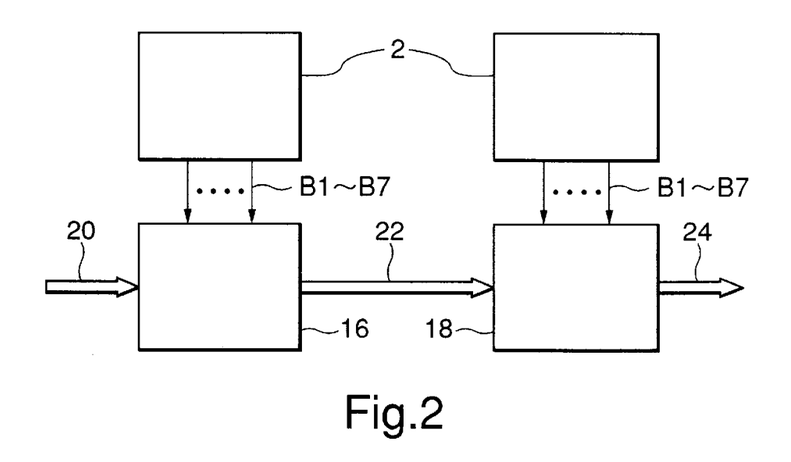
FIG. 2 is a block diagram showing a data communication system utilizing the pseudorandom number generation circuit 2 in FIG. 1.

Now, a data communication system employing such pseudorandom number generation circuits 2 is shown in FIG. 2. The data communication system comprises an enciphering circuit 16, a deciphering circuit 18, and pseudorandom number generation circuits 2. The enciphering circuit 16 enciphers a plain text 20 to be sent by a sender into enciphered data 22. The enciphered data 22 are transmitted to the deciphering circuit 18 via telephone lines or radio. The enciphered data 22 are decoded to deciphered data 24 by the deciphering circuit 18, and is given to the receiver. The deciphered data 24 contains data which are completely identical to the original plain text.

The enciphering circuit 16 and the deciphering circuit 18 carry out enciphering and deciphering based on the pseudorandom numbers B1–B7 supplied by the pseudorandom number generation circuits 2 installed corresponding to each of them. For example, if the plain text 20 comprises seven bit data, the enciphering circuit 16 generates an exclusive OR data for each bit of the seven bit plain text data and each bit of the seven bit pseudorandom number B1–B7, and outputs the result as an enciphered data 22. On the other hand, the deciphering circuit 18 generates an exclusive OR data for each bit of the seven bit enciphered data 22 and each bit of the seven bit pseudorandom number B1–B7, and outputs the result as a deciphered data.

Here, if the pseudorandom number generation circuits 2 provided for each of the enciphering circuit 16 and the deciphering circuit 18 are made to be mutually identical circuits, and the reset signal RST is released at the same time, then the obtained pseudorandom numbers B1–B7 become mutually identical, so that enciphering and deciphering can be performed. As mentioned above, the pseudorandom numbers B1–B7 generated by the pseudorandom number generation circuit 2 have a cycle of $2^7-1$, but the cycle is not repeated monotonously. Namely, since secondary pseudorandom numbers B1–B7 are generated based on the selection signals b1 and b2 which are primary pseudorandom numbers, not only the pseudorandom numbers B1–B7 but also even the timings of their changes occurrence random. Accordingly, attempts to decode the enciphered data 22 using a normal method will meet an extremely difficult situation, which means that the security of data communications is guaranteed.

Figure 4:
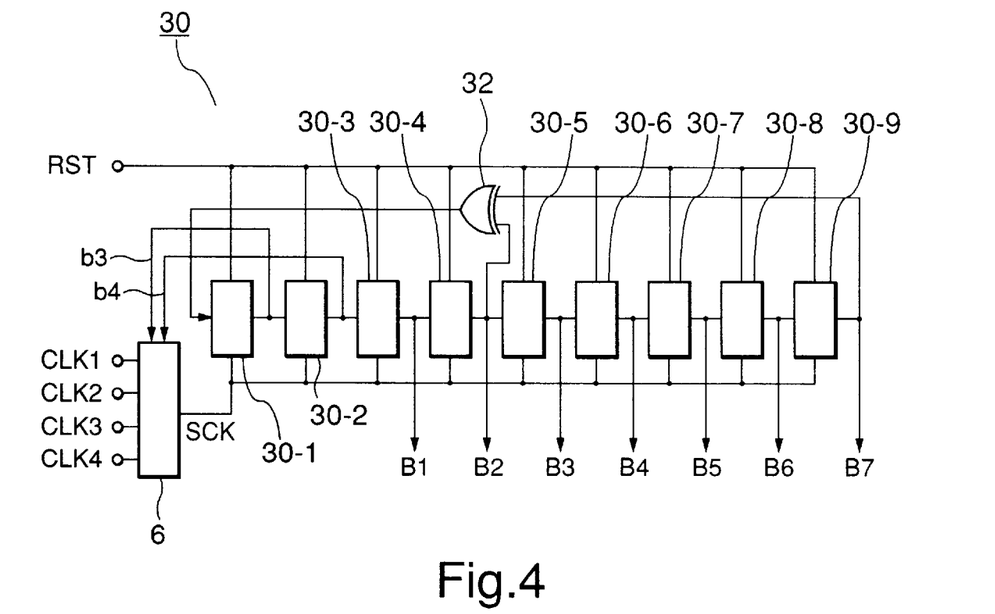
FIG. 4 is a block diagram showing a pseudorandom number generation circuit 30 according to a second embodiment of this invention.

Next, referring to FIG. 4, a second embodiment of the pseudorandom number generation circuit 30 of the present invention will be described.

The pseudorandom number generation circuit 30 of this embodiment includes nine stages of registers, and has an LFSR which carries out the shift operation in response to a shift clock SCK, and a selection circuit 6 which selects one of clocks CLK1, CLK2, CLK3, and CLK4 that are output by a clock generation means, not shown, and outputs it as a shift clock SCK.

The LFSR comprises registers 30-3 to 30-9 connected in series in the number equal to the bit width of generated pseudorandom numbers B1–B7 (seven in this embodiment), redundant registers 30-1 and 30-2, connected in series on the upstream side of the LFSR, whose outputs will not be read from the outside, and an exclusive OR circuit 32 which receives the output signals of the registers 30-4 and 30-9 as its input signals and feeds back its output signal to the register 30-1 as the input signal thereof. Each output signal of the registers 30-1 to 30-8 is connected to the input of the next stage register.

The selection circuit 6 decodes the output signals b3 and b4 of the redundant registers 30-1 and 30-2, and selects one out of the clocks CLK1, CLK2, CLK3, and CLK4 based on the result of the decoding. In this embodiment, it will be assumed that the clock CLK1 is selected when the output signals b3 and b4 of the redundant registers 30-1 and 30-2 are both "0", the clock CLK2 is selected when they are "0" and "1", the clock CLK3 is selected when they are "1" and "0", and the clock CLK4 is selected when they are both "1".

Moreover, each the output signal of each register is initialized to "1" by the input of a reset signal RST. When the reset is released after the initialization, the shift operation is carried out at the timing of the leading edge of the shift clock SCK. Here, the reset signal RST is high-active, so that it enables (resets) when it is "1", and disables (releases the reset) when it is "0".

In this way, values B1 to B7 of the registers 30-3 to 30-9 are read out as a pseudorandom number with seven bit width.

In order to avoid the situation in which the same number is read when the read-out of the pseudorandom number is executed consecutively, it is preferable that the frequencies of the clocks CLK1 to CLK4 are set at twice or more of the highest value of the read frequency.

Next, the time sequential changes of the redundant registers 30-1 and 30-2, and the registers 30-3 to 30-9 will be shown in Table 1.

TABLE 1

Output Values of the Registers

| Time Register | 30-1 | 30-2 | 30-3 | 30-4 | 30-5 | 30-6 | 30-7 | 30-8 | 30-9 |
|---|---|---|---|---|---|---|---|---|---|
| t0 | 1 | 1 | 1 | 1 | 1 | 1 | 1 | 1 | 1 |
| t1 | 0 | 1 | 1 | 1 | 1 | 1 | 1 | 1 | 1 |
| t2 | 0 | 0 | 1 | 1 | 1 | 1 | 1 | 1 | 1 |
| t3 | 0 | 0 | 0 | 1 | 1 | 1 | 1 | 1 | 1 |
| t4 | 0 | 0 | 0 | 0 | 1 | 1 | 1 | 1 | 1 |
| t5 | 1 | 0 | 0 | 0 | 0 | 1 | 1 | 1 | 1 |

Figure 5:
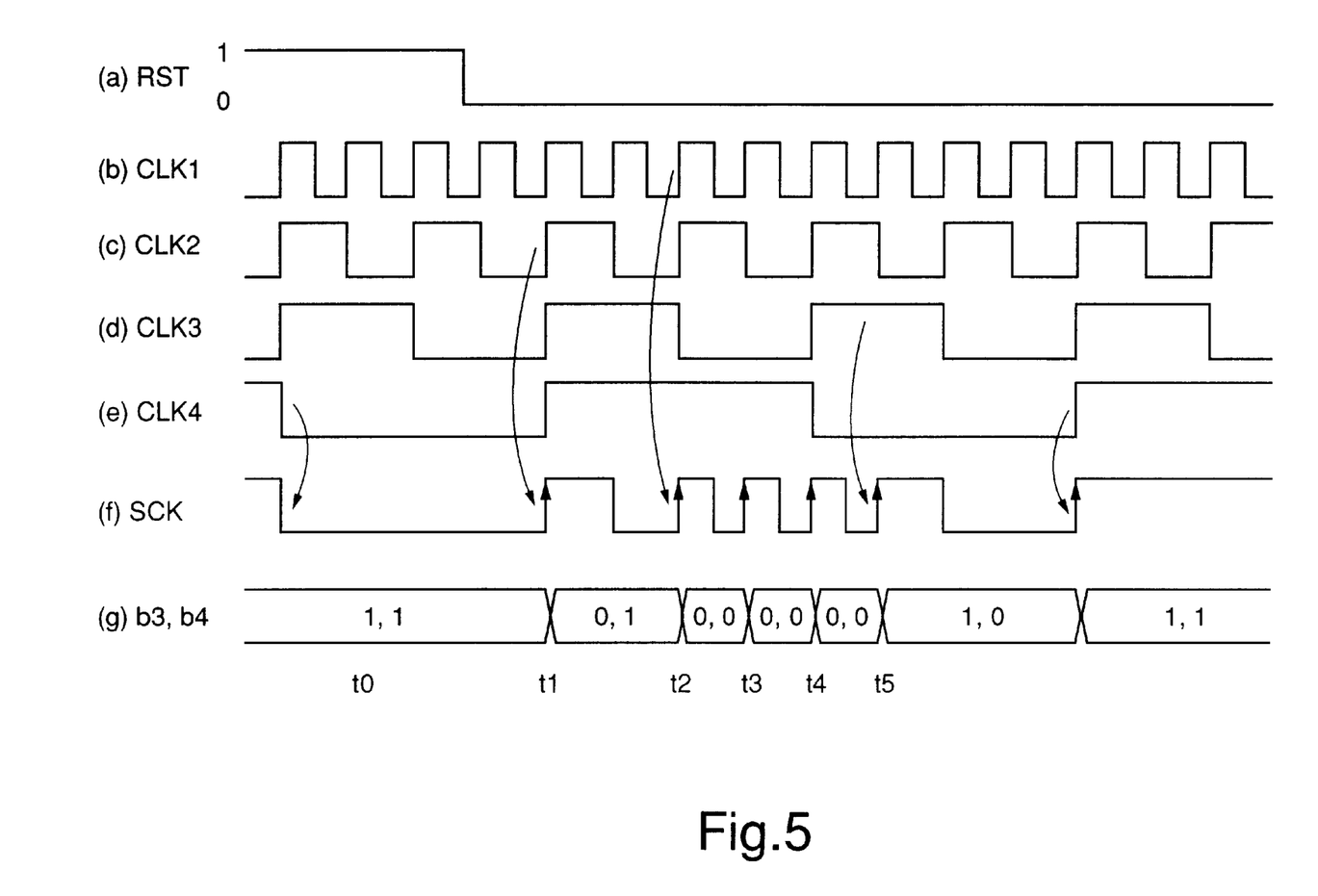
FIG. 5 is a timing chart showing the operation of the pseudorandom number generation circuit 30.

In the table above, t0 is the initial state timing where the reset signal RST is in the enable state, and t1 to t5 are the rise timings of the shift clock SCK after the release of reset, as shown in FIG. 5.

First, with the input of the reset signal RST of level "1", the output value of every one of the registers 30-1 to 30-9 is initialized to "1" (timing t0).

Since the output values b3 and b4 of the redundant registers 30-1 and 30-2 are both "1" in this case, the selection circuit 6 selects the clock CLK4 and outputs it as the shift clock SCK, as shown in FIG. 5(f).

Next, after the reset signal RST goes to the disable state, namely, to "0", the redundant registers 30-1 and 30-2 and the registers 30-3 to 30-9 carry out the shift operation at the rise (timing t1) of the shift clock SCK.

Since the outputs of the redundant registers 30-1 and 30-2 go to "0" and "1", respectively, the selection circuit 6 selects the clock CLK2 and outputs it as the shift clock SCK.

Subsequently, at the rise (timing t2) of the shift clock SCK the registers 30-1 to 30-9 carry out the shift operation. As a result, the output values of both the redundant registers b3 and b4 go to "0", so the selection circuit t6 selects the clock CLK1 and outputs it as the shifty clock SCK.

Repeating similar operation, as the shift operation is carried out at the rise (timing t5) of the shift clock SCK, the output values of the redundant registers 30-1 and 30-2 go to "1" and "0", respectively, so the selection circuit 6 selects the clock CLK3. Thereafter, similar operations are repeated.

If one regards the LFSR of this embodiment to be an LFSR with 9-bit construction, then the maximum cycle of the pseudorandom numbers will be $2^9-1$. Accordingly, in spite of the fact that the number of combinations that can be taken by the pseudorandom number B1–B7 is $2^7-1$, the cycle will become $2^9-1$. Note, however, that this cycle is not regular in that it changes irregularly based on the output values of b3 and b4 of the redundant registers 30-1 and 30-2. On the other hand, the enciphering circuit normally carries out the read operation according to a fixed read clock. Accordingly, the apparent cycle of the pseudorandom numbers as seen from the read circuit is longer than the cycle $2^9-1$ determined by the bit number of the LFSR.

In this embodiment, the shift clock SCK is changed from one value to another based on the output values b3 and b4 of the redundant registers 30-1 and 30-2. Accordingly, even if there is someone who attempts to elucidate the constitution of the pseudorandom number generation circuit, the person will have to face a serious difficulty. Moreover, since it is impossible to directly read out the output values of the redundant registers 30-1 and 30-2 for selecting the shift clock SCK, the elucidation of the circuit structure is made the more difficult.

In the present embodiment, the output of the register 30-4 is used as one of the input to the exclusive OR circuit 32, but the choice is not limited to this case. However, it is desirable to use the output of a register located at a position for which the maximum cycle can be obtained as the input to the exclusive OR circuit 32.

The timings of changes of the generated pseudorandom numbers in the pseudorandom number generation circuit 32 of this embodiment occur also in random fashion, similar to the case of the pseudorandom number generation circuit 2 in the first embodiment. Accordingly, the decoding of the encipher text generated by the pseudorandom number generation circuit 32 is difficult similar to the case of the first embodiment, and yet it has an advantageous feature in that the pseudorandom number generation circuit can be realized with a simpler circuit configuration than in the first embodiment.

Figure 6:
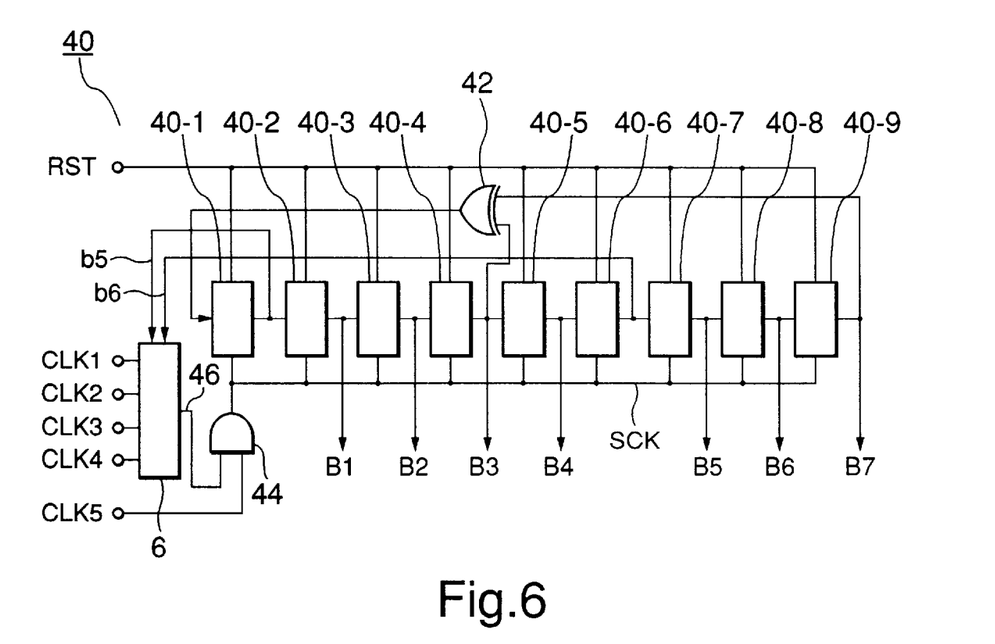
FIG. 6 is a block diagram showing a pseudorandom number generation circuit 40 according to a third embodiment of this invention.
Figure 7:
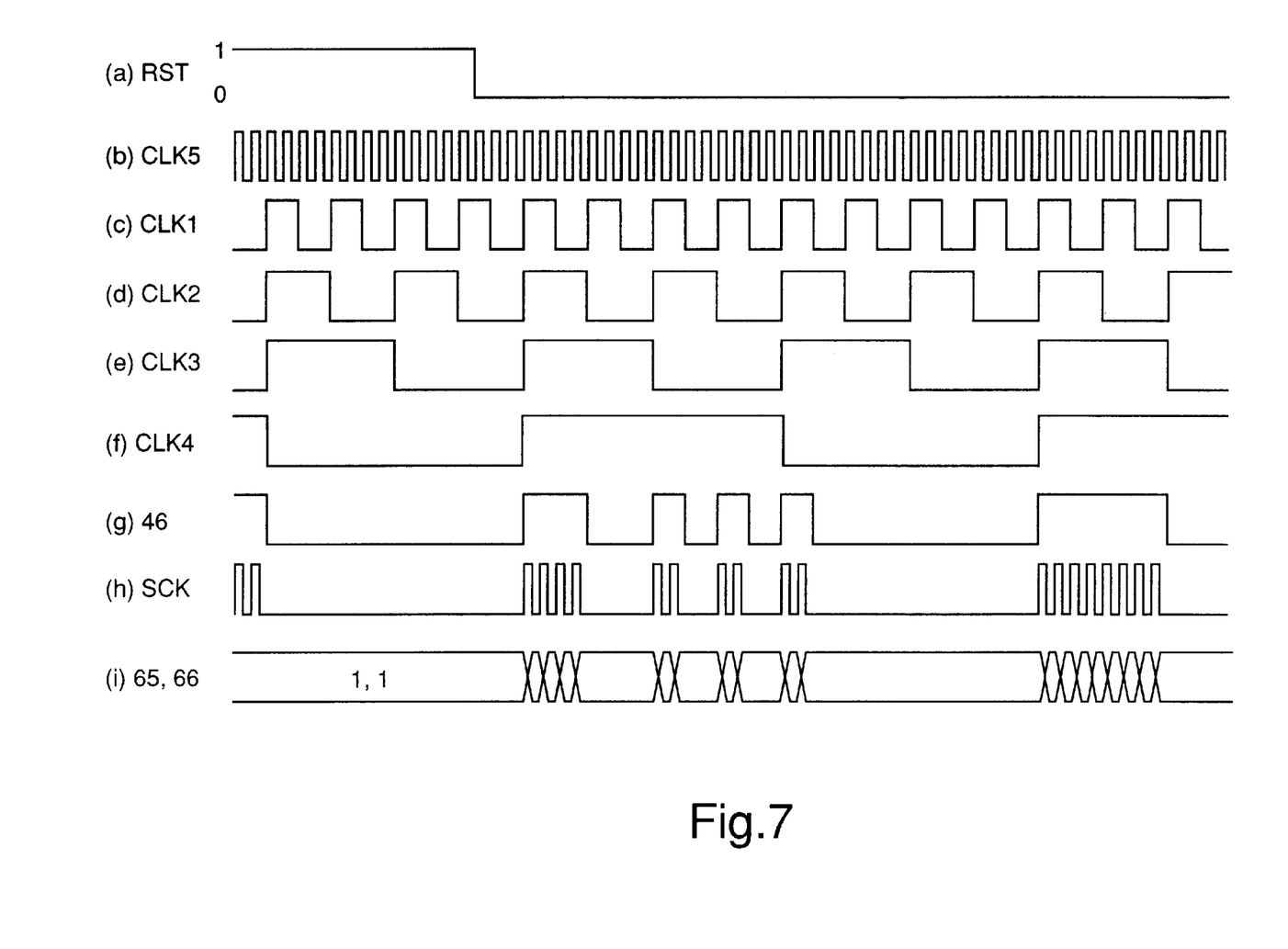
FIG. 7 is a timing chart showing the operation of the pseudorandom number generation circuit 40.

Next, referring to FIG. 6 and FIG. 7, a pseudorandom number generation circuit 40 according to a third embodiment of this invention will be described.

The pseudorandom number generation circuit 40 of this embodiment uses a clock CLK5 which is faster than the clocks CLK1 to CLK4, and has an AND circuit 44 which ANDs the output 46 of the selection circuit 6 and the clock CLK5, and outputs the result as the shift clock, instead of using the output itself of the selection circuit 6 as the shift clock. It is preferable that the clock CLK5 has a sufficiently high frequency in comparison to the clocks CLK1, CLK2, CLK3, and CLK4, and it is preferable that the frequency is 3 to 4 times as high at the least.

Moreover, the clock CLK5 needs not be synchronous with the clocks CLK1 to CLK4. In the case of its being asynchronous with the clocks CLK1 to CLK4, the irregularity of the shift clock is further enhanced, and as a result, the irregularity of the pseudorandom numbers is heightened the more.

The operations of redundant registers 40-1 and 40-2, registers 40-3 to 40-9, and an exclusive OR circuit 42 are similar to those of the pseudorandom number generation circuit 30 of the second embodiment. However, the clock 46 selected by the selection circuit 6 is not directly served as a shift clock of the LFSR, but is served as the shift clock SCK after being ANDed with the high speed clock CLK5 in the AND circuit 44 (FIG. 7(h)). In other word, the shift operation of the LFSR by the clock CLK5 is carried out during the period where either one of the clocks CLK1 to CLK4 selected by the selection circuit 6 is "1".

It is noted that the higher the frequency of the clock CLK5 the larger the number of shifts per unit time of the LFSR. This means that the probability of reading the same value in the periodic read operation of the pseudorandom numbers becomes higher, which means that the randomness is enhanced relatively.

It is to be noted that the bit number of the registers outputting the pseudorandom number sequences, the bit number and the location of the redundant registers, and the kinds of the clocks may be set arbitrarily based on the bit number of required pseudorandom numbers, allowable circuit scale, the length of periodicity of the pseudorandom numbers, and the like, and need not be limited to those of the embodiments described above. For example, the bit number of the redundant registers needs only be one or more, and the redundant registers may be placed at any location without being limited to the upstream of the LFSR.

What is claimed is:

1. A pseudorandom number generation circuit comprising:
   a selection signal generation circuit which generates a selection signal;
   a clock generation circuit generates a plurality of clock signals having different frequencies each other;
   a selection circuit which selects one of said clock signals in response to said selection signal;
   a first shift register circuit including a plurality of first register circuits connected in series which receives said one of said clock signals as a shift clock and carries out shift operation in response to said one of said clock signals;
   a first gate circuit receiving output signals of two of said plurality of first register circuit; and
   means for extract contents of at least a part of said first register circuits.

2. The pseudorandom number generation circuit as claimed in claim 1, wherein said first gate circuit is an exclusive OR circuit.

3. The pseudorandom number generation circuit as claimed in claim 1, wherein said selection signal generation circuit comprises a second shift register circuit including a plurality of second register circuits connected in series which carries out shift operation, a second gate circuit receiving output signals of two of said second plurality of second register circuits, means for supplying an output signal of said second gate circuit to a first stage of said second shift register circuit, and means for extract contents of at least a part of said second register circuits as said selection signal.

4. The pseudorandom number generation circuit as claimed in claim 3, wherein each of said first and second gate circuits is an exclusive OR circuit.

5. A pseudorandom number generation circuit comprising:
   a first shift register circuit being constituted of a plurality of first register circuits in series;
   a second shift register circuit being constituted of a plurality of second register circuits in series;
   means for supplying a first shift clock to said first shift register circuit;
   a clock generation circuit which generates a plurality of clock signals having different frequencies each other;
   a selection circuit selecting one of said clock signals in response to contents of at least one of said first register circuits;
   means for supplying said selected clock signal selected by said selection circuit as a second shift clock to said second shift register circuit; and
   means for extracting contents of at least one of said second register circuits as a pseudorandom number.

6. A pseudorandom number generation circuit comprising:
   a shift register circuit being constituted of a plurality of register circuits including at least a first and a second register circuits;
   a selection circuit selecting one of a plurality of clock signals based on an output signal of said first register circuit;
   means for supplying said selected clock signal selected by said selection circuit to said shift register circuit as a shift clock;
   an exclusive OR circuit receiving outputs signals of two of said second register circuits;
   means for supplying an output signal of said exclusive OR circuit to a first stage register of said shift register circuit; and
   means for extracting contents of at least a part of said second register circuit.

* * * * *